United States Patent [19]
Prasad

[11] Patent Number: 5,960,422
[45] Date of Patent: Sep. 28, 1999

[54] SYSTEM AND METHOD FOR OPTIMIZED SOURCE SELECTION IN AN INFORMATION RETRIEVAL SYSTEM

[75] Inventor: Seema Prasad, Vienna, Va.

[73] Assignee: International Business Machines Corporation, Armonk, N.Y.

[21] Appl. No.: 08/979,109

[22] Filed: Nov. 26, 1997

[51] Int. Cl.$^6$ .................................................... G06F 17/30
[52] U.S. Cl. .................................. 707/2; 707/10; 706/59; 706/47
[58] Field of Search .............................. 707/10, 2, 104; 706/59, 47

[56] References Cited

U.S. PATENT DOCUMENTS

| | | | |
|---|---|---|---|
| 4,774,655 | 9/1988 | Kollin et al. | 364/200 |
| 5,077,694 | 12/1991 | Sansone et al. | 395/600 |
| 5,584,024 | 12/1996 | Shwartz | 395/604 |
| 5,664,171 | 9/1997 | Agrawal et al. | 707/2 |
| 5,812,996 | 9/1998 | Rubin et al. | 707/2 |
| 5,864,841 | 1/1999 | Agrawal et al. | 707/2 |
| 5,864,846 | 1/1999 | Voorhees et al. | 707/5 |

OTHER PUBLICATIONS

"An Intelligent Database Assistant" by G. Jakobson et al., IEEE Expert (USA), vol. 1, No. 2, pp. 65–79, Summer 1986.

"Database Selector for Network Use: A Feasibility Study"; Proceedings of the ASIS Annual Meeting, 1977, vol. 14, "Information Management in the 1980's", Chicago, IL, USA, Sep. 26–Oct. 1977 by Martha Williams, et al.

"The Selection of On–Line Databases for U.K. Co. Information"; Journal of Librarian Information Science, vol. 27, No. 3, pp. 159–170, Sep. 1995, by G. Tseng et al.

"Adaptive User Models for Intelligent Information Filtering"; Intelligent Systems, Proceedings of 3rd Golden West International Conference; Las Vegas, Nev., Jun. 6–8, 1994 by K. J. Mock et al.

"Internet Categorization in Search: A Self–Organizing Approach"; Journal of Visual Communications Image Represent.(USA), vol. 7, No. 1, Academic Press, pp.88–102, Mar. 1996, by C. Hsinchun et al.

Dasarathy, Minimal Consistent Set Identification for Optimal Nearest Neighbor Decision Systems Design, IEEE Transactions on Systems, MAN, and Cybernetics, vol. 24, No. 3, pp. 511–517, Mar. 1994.

Gurajada et al, Equidepth of a Date set Based on Finding its Median, IEEE Procedings of the 1991 Symposium, pp. 92–101, Apr. 1991.

*Primary Examiner*—Thomas G. Black
*Assistant Examiner*—Frantz Coby
*Attorney, Agent, or Firm*—Morgan & Finnegan, LLP

[57] ABSTRACT

In an information retrieval system, an automated system optimizes selection of sources in a distributed information system for query searching. A training set of documents is created for each source by randomly selecting significant portions of the documents thereof. A test set documents is created for each source from the documents not included in the training set. Each document in the training and test set is defined in terms of features/attributes and a name as samples representing individual sources. Pattern recognizing means process the samples to recognize patterns in the documents to distinguish one source from another source. Rule generating means provide a set of DNF rules from the patterns as a model representing each source. The test set of documents is expressed in terms of DNF rules. Evaluating means create a final classification model after minimizing any error between the DNF rules for the training and test sets. Query means enable a user to express a query in terms of features/attributes and DNF rules which when applied to the final model automatically select the optimal sources for query searching. The sources may also be expressed in taxonomic groupings which reduces the number of data sources and speeds query searching on a distributive information network by a user.

14 Claims, 3 Drawing Sheets

SYSTEM AND METHOD FOR OPTIMIZED SOURCE SELECTION IN AN INFORMATION RETRIEVAL SYSTEM

BACKGROUND OF INVENTION

1. Field of Invention

This invention relates to information retrieval systems. More particularly, the invention relates to optimized source selection for query searching in a distributed information system, e.g., the Internet.

2. Description of the Prior Art

As the Internet has expanded in public interest, the number of available sources or databases has increased to respond to such interest. The amount of data available to users has increased dramatically. The result is an information overload for the user. Because of such information overload, a query or request for information from the Internet could be very time consuming if all the sources were searched for response to the query. Moreover, the information processing resources necessary to support such queries would be prohibitive and the elapsed time to complete a query would be so extensive to the point that user interest in the Internet would diminish. Also, the search results obtained would be little, if any, better than a query limited to sources judged most likely by the user to contain relevant information or documents. What is needed to overcome information overload in distributed information system, e.g. the Internet is an automated system and method of information retrieval which optimally selects sources or databases most likely to provide the best response to a user query.

Prior art related to source selection in an information retrieval system includes the following:

An article entitled "An Intelligent Database Assistant" by G. Jakobson, et. al., published in the International Electronic Electrical Engineers (IEEE Expert (USA), Vol. 1 No. 2, pp. 65–79, Summer 1986, discloses an intelligent database assistant called FRED. The assistant uses artificial intelligence techniques and gives users substantial help in data selection, query formulation and data interpretation. FRED provides querying in a cooperative natural language dialogue, automatic database selection, automatic query generation and portable access to different database systems.

An article entitled "Database Selector for Network Use: A Feasibility Study", published in the Proceedings of the ASIS Annual Meeting 1977, Vol. 14, "Information Management in the 1980's", Chicago, Ill., USA, Sep. 26–October 1977, by Henry Williams et. al, discloses an automatic database selector which operates on user query terms and provides a relative ranking of databases according to applicability to the query. A test version Database Selector consists of a file containing terminology from 20 major databases, programs for data management and file generation, programs for query processing and a mathematical model for normalizing the variability (differing numbers of years worth of files, controlled versus uncontrolled terminology, hierarchial and multilevel vocabularies, etc.) that is found in multiple natural language databases. A database selector helps users and searchers determine file appropriateness for queries or help processors and producers with database comparisons, vocabulary comparisons and vocabulary compatibility problems.

An article entitled "The Selection of On-Line Databases for U.K. Company Information" published in the Journal of Librarian Information Science, Vol. 27 No. 3, pp. 159–70, September 1995, by G. Tseng et al., discloses an expert system designed to assist novice and end-users on-line searchers to identify which database to use for particular types of company information. A Company Information Database Advisor (CIDA) assists selection of on-line databases for range types of U.K. company information: basic company details; company financial information; company ownership and shareholdings. CIDA is designed to locate information about U.K. companies, the databases recommended are both national and international. The paper presents a database selection criteria identified during the project for 5 of the original CDIA company information categories. The paper outlines specific functions for which CIDA was designed and indicates significant factors influencing choice of databases for certain types of company information.

An article entitled "Adaptive User Models for Intelligent Information Filtering" published in Intelligent Systems, Proceedings of Third Golden West International Conference, Las Vegas, Nev., Jun. 6–8, 1994, by K. J. Mock et al., discloses an intelligent information filtering system which reduces a searchers burden by automatically eliminating incoming data predicted to be irrelevant. These predictions are learned by adapting an internal user model which is based upon user interaction. The report examines three techniques for filtering information: global hill climbing, genetic algorithms, and preliminary work with neural networks using radial based functions.

An article entitled "Internet Categorization in Search: A Self-Organizing Approach" published in the Journal of Visual Communications Image Represent. (USA), Vol. 7 No. 1, Academic Press, pp. 88–102, March 1996, by C. Hsinchun et al., a concept based categorization and search capability for World Wide Web (WWW) servers based on selected machine learning algorithms. The search method addresses an internet search problem by first categorizing the contents of internet documents. A multilayer neural network clustering algorithm employing a self-organizing map feature categorizes internet home pages according to their content. A category hierarchies created served and petitioned vast internet services into subject specific categories and databases and improved internet key word searching and/or browsing. None of the prior art discloses or suggests optimizing the source selection by generating a model for classifying sources and then using the model for predicting the sources most likely to contain documents that satisfy a user query.

SUMMARY OF THE INVENTION

An object of the invention is an information retrieval system and method for automatically and optimally selecting sources most likely to satisfy a query in an information network.

Another object is a system and method using supervised learning techniques for generating a model to classify sources for automatic and optimal selection of sources most likely to provide responses in an information network which satisfy a user query.

Another object is a system and method in an information network using rule induction to generate a model for classifying sources most likely to contain information responsive to a query.

Another object is a system and method for generating a training set of documents in an information network and using disjunctive normal form rules to create a model of sources in the network.

These and other objects, features and advantages are achieved in an information retrieval system and method for automatically and optimally selecting sources for a query in an information network, e.g., the Internet, using supervised learning and/or taxonomic grouping. The network includes means for generating a user query to obtain a list of all available data sources relevant to the query in an information network. A supervised machine learning technique called "Rule Induction" is used to provide automated selection of desired sources based on the user's query. A model is generated for classifying such sources by applying rule induction techniques on a random collection of documents (training set) in the sources. The training set is created from a random sample of 90% of the documents in each source. The remaining 10% is used as the test set for refining the model. A dictionary is created to define features and attributes representing individual sources. All documents are transformed into a set of samples comprising a feature, a word or phrase and a source name used in the dictionary. A prior art algorithm is used to recognize patterns in the sets of samples to distinguish one source from another and generate a set of Disjunctive Normal Form (DNF) Rules, as a model, representing each source. The model is refined and classification errors are reduced by applying the DNF rules to the test set. When a query is defined in terms of features/ attributes and inputted, the model predicts the top "N" sources most likely to contain documents satisfying the query. By grouping sources together in taxonomic classifications, a model can be generated to have DNF rules representing each taxonomy classification rather than each source, and the resulting model further enhances source selection for user queries.

DESCRIPTION OF DRAWINGS

The invention will be further understood in conjunction with a description of a preferred embodiment taken together with an appended drawing, in which.

DESCRIPTION OF PREFERRED EMBODIMENT

Figure 1:
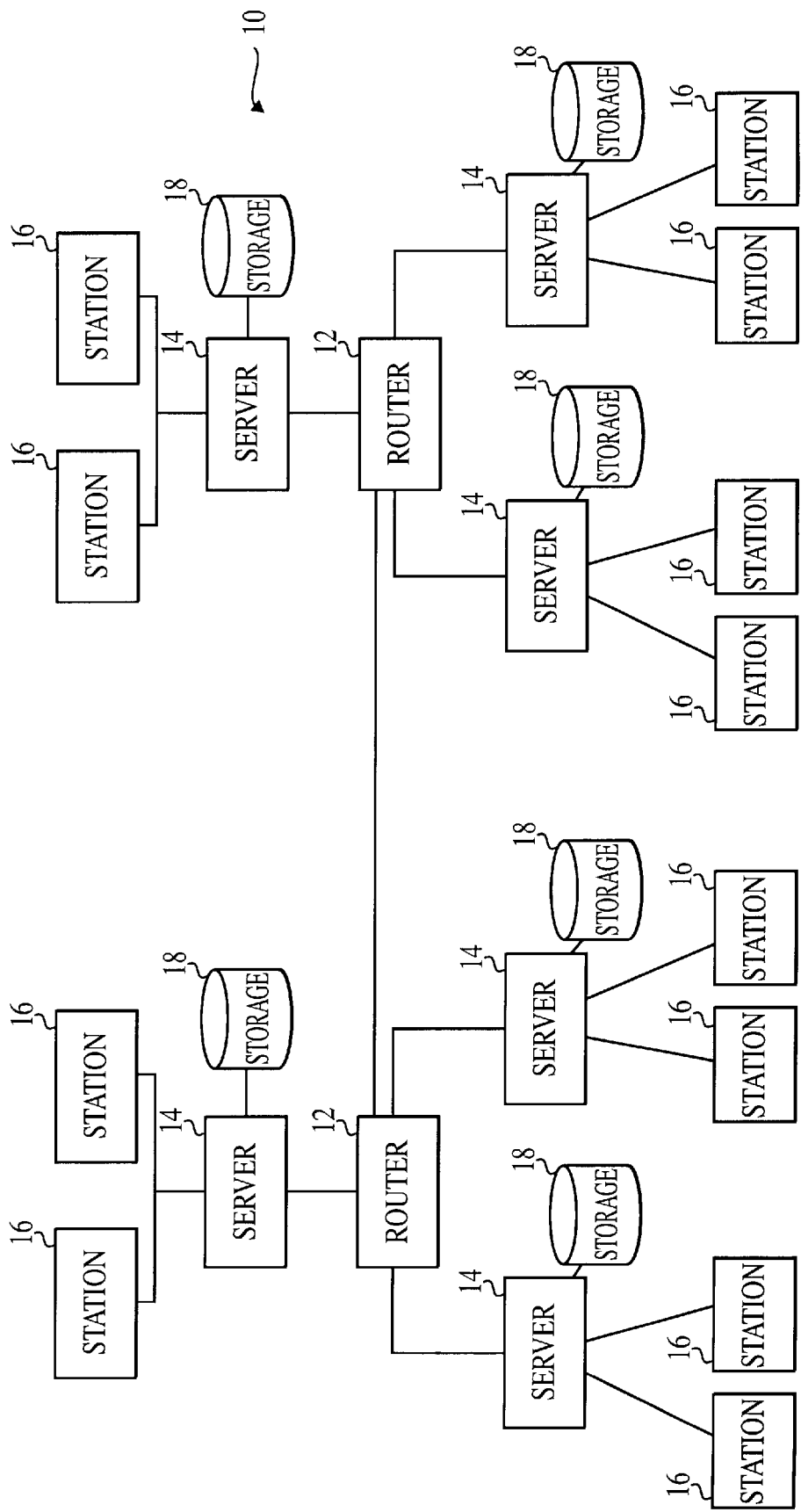
FIG. 1 is a representation of one embodiment of a prior art information network to which the invention is applicable.

FIG. 1 discloses a distributed information network, e.g., Internet 10 including a plurality of routers 12, 12' for connecting servers $14^1$–$14^n$ to users $U^1 \cdots U^n$ having access to the servers through a Personal Computer (PC) or the like station $16^1 \ldots 16^n$. The Internet and its operation are described in a text "How to Use the Internet" by J. Eddings, published by Ziff-Davis Press, Emeryville, Calif., 1994 (ISBN 1-56276-192-7). Each server includes one or more storage disks 18 containing sources or databases or Uniform Resource Locators (URL) for automated searching by Internet users. Standard search engines, e.g., Lycos developed by Carnegie-Mellon University or Yahoo developed by Stanford University are available to the users for searching the databases in response to a user query. The present invention addresses the problem of automatically and optimally selecting sources in the network 10 which most likely contain relevant documents to a query entered into the network 10 by a user through a station 16.

Figure 2:
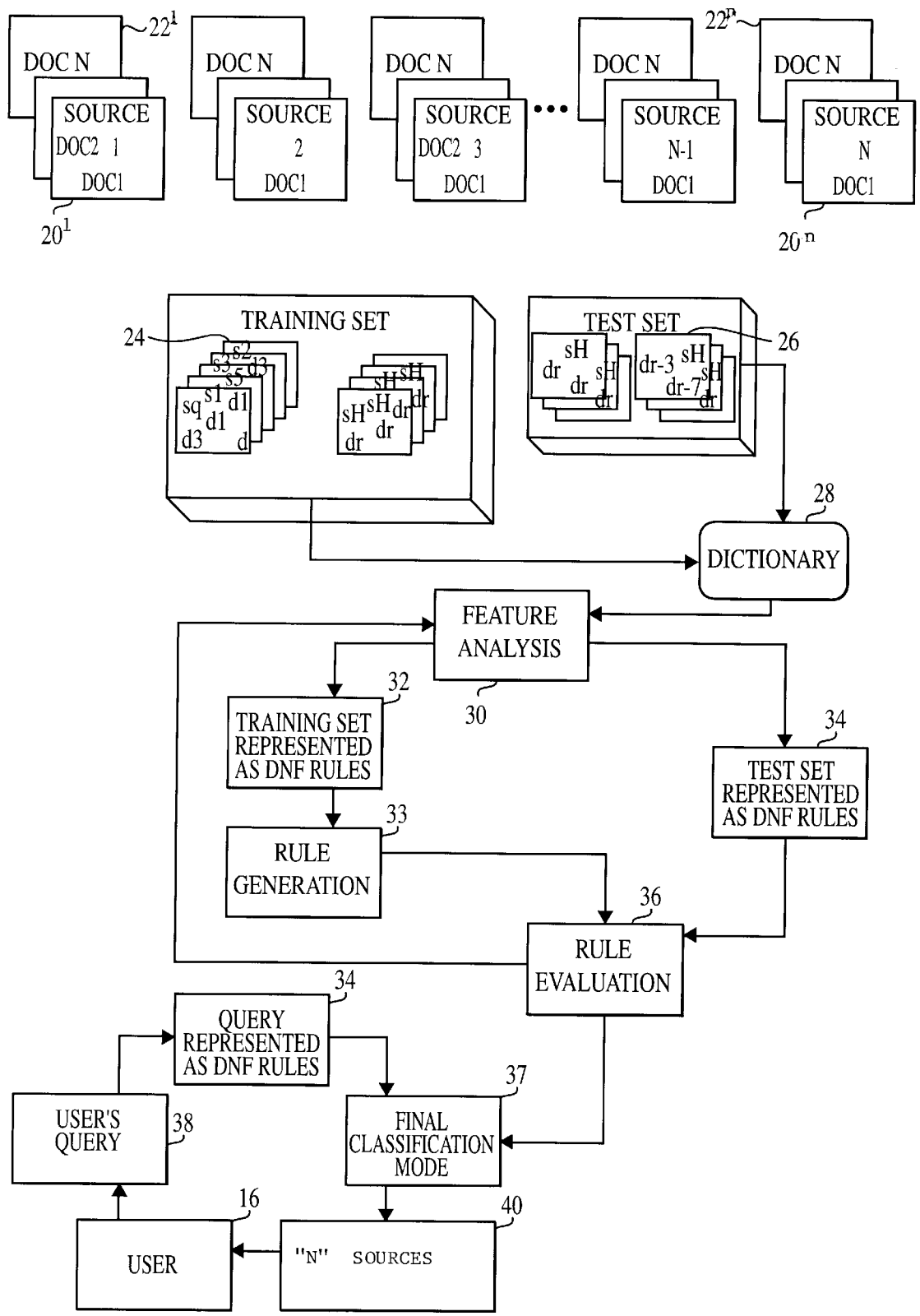
FIG. 2 is a representation of operations employed in source selection in the information network of FIG. 1 and incorporating the principles of the present invention.

In FIG. 2, a plurality of data sources $20^1 \ldots 20^n$, each source containing a plurality of documents $22^1 \ldots 22^n$ are available for searching in response to a query entered into the system 10 by a user. The data sources are stored in the databases 18 associated with the servers 14 (See FIG. 1). As a solution to providing an automatic and optimal selection of desired data sources for user queries, a form of supervised machine learning called "Rule Induction" generates a model for classifying the sources 20 for query searching. The model is then used for predicting the top "N" sources most likely to contain documents that satisfy a user's query. As an overview, "Rule Induction" takes a sample set of documents called a training set and derives "Disjunctive Normal Form Rules" representative of the model which is descriptive of the data sources 20. "Rule Induction" is often the preferred approach to classification modelling and prediction due to the enhanced capability and interpretability of decision rules in responding to user queries.

In order to use Rule-based Induction a set of training documents 24 is collected from each source 20. The training set 24 is created by a random set of documents from each source, typically about 90% of the documents with the remaining 10% of the documents forming a test set 26. After formation of the training set 24 and the test set 26, a dictionary 28 is created to define the features and attributes of each source. A feature can be a single word or phrase descriptive of a source. An attribute is a characteristic of a source. The dictionary can be created semi-automatically with the aid of a human expert as well as a computer or created completely automatically using the technique described in a paper entitled "Automatic Learning of Decision Rules for Text Categorization" by C. Apte, et al., published in the ACM Transactions on Knowledge and Data Engineering at pp. 233–251, 1994. Briefly, the article discloses the creation of universal dictionaries, i.e dictionaries derived from the full collection of documents on all topics. Both single words and word pairs are entered in the dictionaries. The single word and pair lists are merged, sorted by frequency, and only those terms in the most frequent 10,000 are retained. The list is further reduced by eliminating the bottom ranking terms and also by eliminating all function terms.

A feature analysis 30 is performed for each document in a source using the dictionary to represent each document in terms of its features and associated source name. Rule induction 32 is applied to the training set to recognize patterns in the features and attributes to distinguish sources from one another. Rule generation 33 is applied to the training set expressed in terms of features/attributes and source name. A prior art algorithm entitled "Rules Abstraction for Modelling and Prediction (RAMP)" by C. Apte et al, published by IBM Research Division, Technical Report RC-20271 at Yorktown, N.Y. RAMP generates a set of Disjunctive Normal Form Rules as a classification model descriptive of the training set. Briefly, RAMP discloses an algorithm which generates "minimal" classification rules from tabular data sets where one of the columns is a "class" variable and the remaining columns are "independent" features. The data set is completely discretized (i.e continuous valued features are discretized into a finite set of discrete values, categorical features are left untouched) prior to rule generation. While the RAMP approach to generating classification rules is similar to techniques that directly generate rules from data, RAMP's primary approach strives for a "minimal" rule set that is complete and consistent with training data. The core heuristics in the RAMP rule generation system for achieving minimality consists of iterating (for a reasonable number of rounds) over two key sub-sets. A generalization step takes each rule in the current set (initially each example is a rule) and opportunisticaly generalizes it to remove other rules that are subsumed. A specialization/reformulation step takes each rule in the current set and specializes it to the most specific rule necessary to continue covering only the unique examples. Redundant rules disappear during this step. This annealing-like approach may be potentially indefinite. However, a limit is used that controls how long the system should keep iterating without observing a reduction. If no reduction takes place within the limit, RAMP stops the minimization process.

A rule evaluation 36 is performed after test set rules 34 are generated following the procedures described in operations 30, 32 and 33. Any difference between the training and test set rules are adjusted to satisfy both sets from a DNF rule standpoint. A final classification model 38 is represented as a set of DNF rules with a set representing each source. The final classification model 38 automatically and optimally selects the top "N" sources 40 in response to a user 16 inputting a query 38 expressed in terms of features and attributes and represented as a DNF rule 39.

Figure 3:
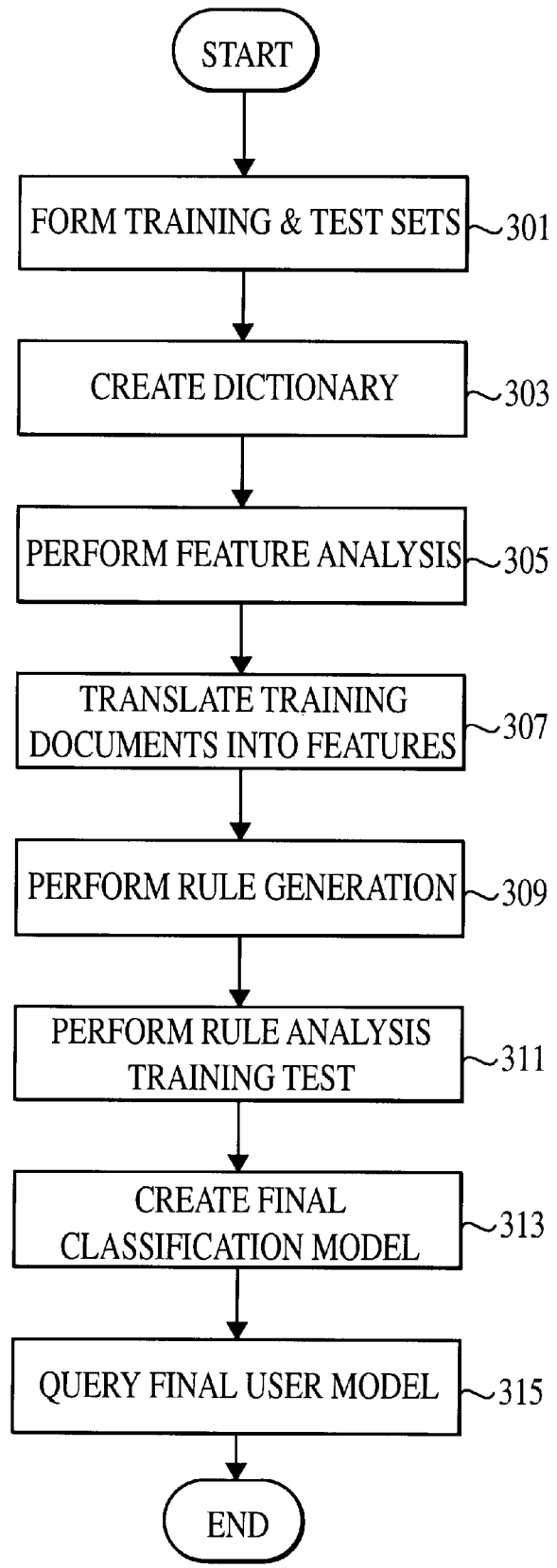
FIG. 3 is a flow diagram re-stating the operations in FIG. 2 for automatic and optimal source selection to a user query in an information network.

In FIG. 3, a method of the present invention is as follows:

An operation 301 obtains a random set of documents representing approximately 90% from each source to form a training set. The remaining 10% documents are used as a test set.

An operation 303 creates a dictionary of words or phrases indicative of the features and attributes of each source. The dictionary may be created with the aid of a human expert or automatically using the technique described in the paper "Automated Learning of Decision Rules for Text Categorization", supra.

An operation 305 performs feature analysis to decide which words/phrases represent features important toward classifying a document into a given source for the training and test sets.

An operation 307 converts the documents in the training set into features and attributes descriptive of the sources. An operation 309 performs pattern analysis on the features expressed for each document to distinguish one source from another. The pattern analysis may be performed by an algorithm RAMP, supra, and generates a set of DNF rules for each source definitive of the documents in the source expressed in terms of features and attributes. The DNF rules represent a classification model for the training set for query searching expressed in terms of features and attributes represented in terms of DNF rules.

An operation 311 is performed to refine the source model after the test set is expressed in terms of features/attributes and related DNF rules. The operation 311 is completed when any classification error between the training and test sets expressed in terms of DNF rules is minimized by iterating operations 305, 307 and 309 for the sets. A final classification is established for each source expressed in terms of a set of DNF rules in an operation 313. An operation 315 applies a user query in terms of features and attributes against the classification model to obtain a prediction of a top 'N' sources most likely to contain documents satisfying the query, after which the method ends.

Automatic and optimal selection of sources for a user query to a distributive information network can be further enhanced by assigning each source to a registration database in which an additional attribute, such as a taxonomic grouping, can be assigned to each document. Taxonomic grouping allows DNF rules to be generated following the method described in FIG. 3 for each taxonomic group rather than sources. The taxonomic groupings result in fewer individual groupings than sources and speed the automatic and optimal selection of documents most likely responsive to a user query.

While the invention has been described in terms of a specific embodiment, various changes may be made therein without departing from the spirit and scope of the invention, as defined in the appended claims in which:

I claim:

1. In a distributed information system including databases as sources of documents for query searching, a method of optimizing the selection of sources for satisfying a query, comprising the steps of:
    a) forming a training set of documents by randomly selecting significant portions of the documents from each of the sources;
    b) forming a test set of documents by using the set of documents excluded in the training set;
    c) defining each document in the training and test set in terms of features/attributes and a name as samples representing individual sources;
    d) processing the samples using an algorithm to recognize patterns in the documents which distinguish one source from another source;
    e) generating a set of rules from the patterns as a model using the algorithm; and
    f) applying to the model a query in terms of desired features/attributes to predict the optimum sources satisfying the query.

2. The method of claim 1 further comprising the step of;
    a) refining and reducing classification errors in the model of step e) by applying the model to the test set.

3. The method of claim 1 further comprising the step of:
    a) generating a dictionary to define features/attributes representing documents in each source.

4. The method of claim 1 wherein the rules are in the Disjunctive Normal Form (DNF).

5. The method of claim 1 further comprising the step of:
    a) grouping the sources by taxonomy clarification; and
    b) generating a set of rules for each taxonomy classification for query searching.

6. The method of claim 1 further comprising the step of:
    a) forming and indexing a meta-document for each source; and
    b) generating a set of rules for each indexed source meta-document for query searching.

7. The method of claim 1 further comprising the step of generating a set of rules as a model for each database.

8. An automated system for optimized selection of sources in a distributed information system for query searching, comprising:
    a) means for forming a training set of documents at each source by randomly selecting a significant portions of the documents;
    b) means for forming a test of the documents at each source not included in the training set;
    c) means for defining each document in the training and test set in terms of features/attributes and a name as samples representing individual sources;
    d) means for processing the samples to recognize patterns in the documents to distinguish one source from another source using an algorithm;
    e) means for generating a set of rules from the patterns as a model representing each source using the algorithm; and f) means for applying to the model a query in terms of desired features/attributes to predict the optimum sources satisfying the query.

9. The system of claim 8 further comprising;

a) means for refining and reducing classification errors in the model.

10. The system of claim 8 further comprising:

a) means for generating a dictionary to define features/attributes representing documents in each source.

11. The system of claim 8 wherein the rules are in the Disjunctive Normal Form (DNF).

12. The system of claim 8 further comprising:

a) means for grouping the sources by taxonomy classification; and b) means for generating a set of rules for each taxonomy classification for query searching.

13. The system of claim 1 further comprising:

a) means for forming and indexing a meta-document for each source; and b) means for generating a set of rules for each indexed source meta-document for query searching.

14. The system of claim 1 further comprising:

a) means for generating a set of rules as a model for each database.

* * * * *